(12) United States Patent
Gage et al.

(10) Patent No.: US 11,867,286 B1
(45) Date of Patent: Jan. 9, 2024

(54) TRANSMISSION FLUID TEMPERATURE CONTROL SYSTEM

(71) Applicant: FORD GLOBAL TECHNOLOGIES, LLC, Dearborn, MI (US)

(72) Inventors: Raymond Theodore Gage, Northville, MI (US); Derek Kinch, Ypsilanti, MI (US); Sylvia Chen, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/844,248

(22) Filed: Jun. 20, 2022

(51) Int. Cl.
| | |
|---|---|
| *F16H 57/04* | (2010.01) |
| *F16H 61/4043* | (2010.01) |
| *F16H 61/02* | (2006.01) |
| *F16H 61/00* | (2006.01) |
| *F16H 61/4165* | (2010.01) |
| *F16H 45/02* | (2006.01) |

(52) U.S. Cl.
CPC ..... *F16H 61/4043* (2013.01); *F16H 57/0417* (2013.01); *F16H 57/0435* (2013.01); *F16H 61/0003* (2013.01); *F16H 61/0025* (2013.01); *F16H 61/0251* (2013.01); *F16H 61/4165* (2013.01); *F16H 45/02* (2013.01); *F16H 57/0413* (2013.01)

(58) Field of Classification Search
CPC ............. F16H 57/0412; F16H 57/0413; F16H 57/0415; F16H 57/0417; F16H 57/0435
See application file for complete search history.

(56) References Cited

U.S. PATENT DOCUMENTS

| | | | |
|---|---|---|---|
| 8,521,382 B2 | 8/2013 | Kieliszewski | |
| 9,982,779 B2 | 5/2018 | Kinch et al. | |
| 10,260,824 B2* | 4/2019 | Brinkley | F28F 27/02 |
| 2007/0295475 A1* | 12/2007 | Samie | F16H 57/0415 |
| | | | 165/41 |

(Continued)

FOREIGN PATENT DOCUMENTS

| | | |
|---|---|---|
| CN | 1075004 C | 11/2001 |
| CN | 202013270 U | 10/2011 |

(Continued)

*Primary Examiner* — Kenneth Bomberg
*Assistant Examiner* — Matthew Wiblin
(74) *Attorney, Agent, or Firm* — Vincent Mastrogiacomo; Brooks Kushman P.C.

(57) ABSTRACT

A vehicle includes a heat exchanger, a transmission, and a controller. The transmission is configured to transfer power within a powertrain. The transmission has a primary fluid circuit, a secondary fluid circuit, and a valve. The secondary fluid circuit is configured to divert the fluid from the primary fluid circuit and deliver the fluid to the heat exchanger. The valve is configured to control diverting fluid from the primary fluid circuit to the secondary fluid circuit. The controller is programmed to, in response to a temperature of the fluid being outside of a desired range, open the valve to direct the fluid toward the heat exchanger via the secondary fluid circuit. The controller is further programmed to, in response to the temperature of the fluid being within the desired range, close the valve to isolate the fluid from the secondary fluid circuit and the heat exchanger.

20 Claims, 4 Drawing Sheets

(56) References Cited

U.S. PATENT DOCUMENTS

| | | | |
|---|---|---|---|
| 2010/0062890 A1* | 3/2010 | Shimizu | F16H 61/0021 137/599.09 |
| 2018/0156506 A1 | 6/2018 | Benson | |
| 2021/0010392 A1 | 1/2021 | Molesini et al. | |

FOREIGN PATENT DOCUMENTS

| | | | | |
|---|---|---|---|---|
| CN | 102169053 B | 7/2012 | | |
| CN | 102705056 A | 10/2012 | | |
| CN | 107202156 B | 5/2019 | | |
| DE | 10218080 A1 | 1/2003 | | |
| DE | 102005039815 A1 | 3/2007 | | |
| DE | 102007018504 A1 | 10/2008 | | |
| DE | 102008035253 A1 | 2/2009 | | |
| DE | 112009000435 T5 | 3/2011 | | |
| DE | 102014018729 A1 | 6/2015 | | |
| DE | 102018002025 A1 | 9/2019 | | |
| DE | 102018002042 A1 | 9/2019 | | |
| DE | 102018002043 A1 | 9/2019 | | |
| DE | 102018002581 A1 | 10/2019 | | |
| EP | 1486693 A1 | 12/2004 | | |
| EP | 1674765 B1 | 2/2008 | | |
| EP | 3312477 A1 * | 4/2018 | | F01M 1/02 |
| EP | 3845777 A1 | 7/2021 | | |
| KR | 19980055218 U | 10/1998 | | |
| KR | 20060101321 A | 9/2006 | | |
| KR | 20140003529 A | 1/2014 | | |
| KR | 20150128679 A | 11/2015 | | |
| KR | 20160003626 A | 1/2016 | | |
| WO | 2003095927 A1 | 11/2003 | | |
| WO | WO-2007096719 A1 * | 8/2007 | | B60K 11/04 |

\* cited by examiner

TRANSMISSION FLUID TEMPERATURE CONTROL SYSTEM

TECHNICAL FIELD

The present disclosure relates to vehicles and transmissions for vehicles.

BACKGROUND

Vehicles may include transmissions that are configured to provide multiple gear ratios between a power generating device and one or more drive wheels.

SUMMARY

A vehicle includes a powerplant, drive wheels, a heat exchanger, a transmission, and a controller. The powerplant is configured to generate power to propel the vehicle. The transmission is configured to transfer power from the powerplant to the drive wheels. The transmission has at least one clutch, a primary circuit, a secondary circuit, a valve, and a temperature sensor. The primary circuit is configured direct fluid to the at least one clutch to actuate the at least one clutch. The secondary circuit is configured to divert the fluid from the primary circuit and deliver the fluid to the heat exchanger. The valve is configured to control the flow of the fluid from the primary circuit to the secondary circuit. The valve is further configured to close to isolate the secondary circuit from the primary circuit and open to direct fluid from the primary circuit to the secondary circuit. The temperature sensor is configured to detect a temperature of the fluid. The controller is programmed to, in response to receiving a signal from the temperature sensor indicating that the temperature of the fluid is outside of a desired range, open the valve to direct the fluid toward the heat exchanger via the secondary circuit. The controller is further programmed to, in response to receiving a signal from the temperature sensor indicating that the temperature of the fluid is within the desired range, close the valve to isolate the fluid from the secondary circuit and the heat exchanger.

A vehicle includes a heat exchanger, a transmission, and a controller. The transmission is configured to transfer power within a powertrain. The transmission has a primary fluid circuit, a secondary fluid circuit, and a valve. The primary fluid circuit is configured to deliver fluid to at least one clutch. The secondary fluid circuit is configured to divert the fluid from the primary fluid circuit and deliver the fluid to the heat exchanger. The valve is configured to close to isolate the secondary fluid circuit from the primary fluid circuit, open to direct fluid from the primary fluid circuit to the secondary fluid circuit, and transition between partially opened positions to adjust a flow rate of the fluid from the primary fluid circuit to the secondary fluid circuit. The controller is programmed to, in response to a temperature of the fluid being outside of a desired range, open the valve to direct the fluid toward the heat exchanger via the secondary fluid circuit. The controller is further programmed to, in response to the temperature of the fluid being within the desired range, close the valve to isolate the fluid from the secondary fluid circuit and the heat exchanger. The controller is further programmed to, in response to a change in the temperature of the fluid toward the desired range, adjust the valve between partially opened positions to decrease the flow rate of the fluid from the primary fluid circuit to the secondary fluid circuit. The controller is further programmed to, in response to a change in the temperature of the fluid away from the desired range, adjust the valve between partially opened positions to increase the flow rate of the fluid from the primary fluid circuit to the secondary fluid circuit.

A vehicle includes a heat exchanger, a transmission, and a controller. The transmission is configured to transfer power within a powertrain. The transmission has a primary fluid circuit, a secondary fluid circuit, and a valve. The secondary fluid circuit is configured to divert the fluid from the primary fluid circuit and deliver the fluid to the heat exchanger. The valve is configured to close to isolate the secondary fluid circuit from the primary fluid circuit and open to direct fluid from the primary fluid circuit to the secondary fluid circuit. The controller is programmed to, in response to a temperature of the fluid being outside of a desired range, open the valve to direct the fluid toward the heat exchanger via the secondary fluid circuit. The controller is further programmed to, in response to the temperature of the fluid being within the desired range, close the valve to isolate the fluid from the secondary fluid circuit and the heat exchanger.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
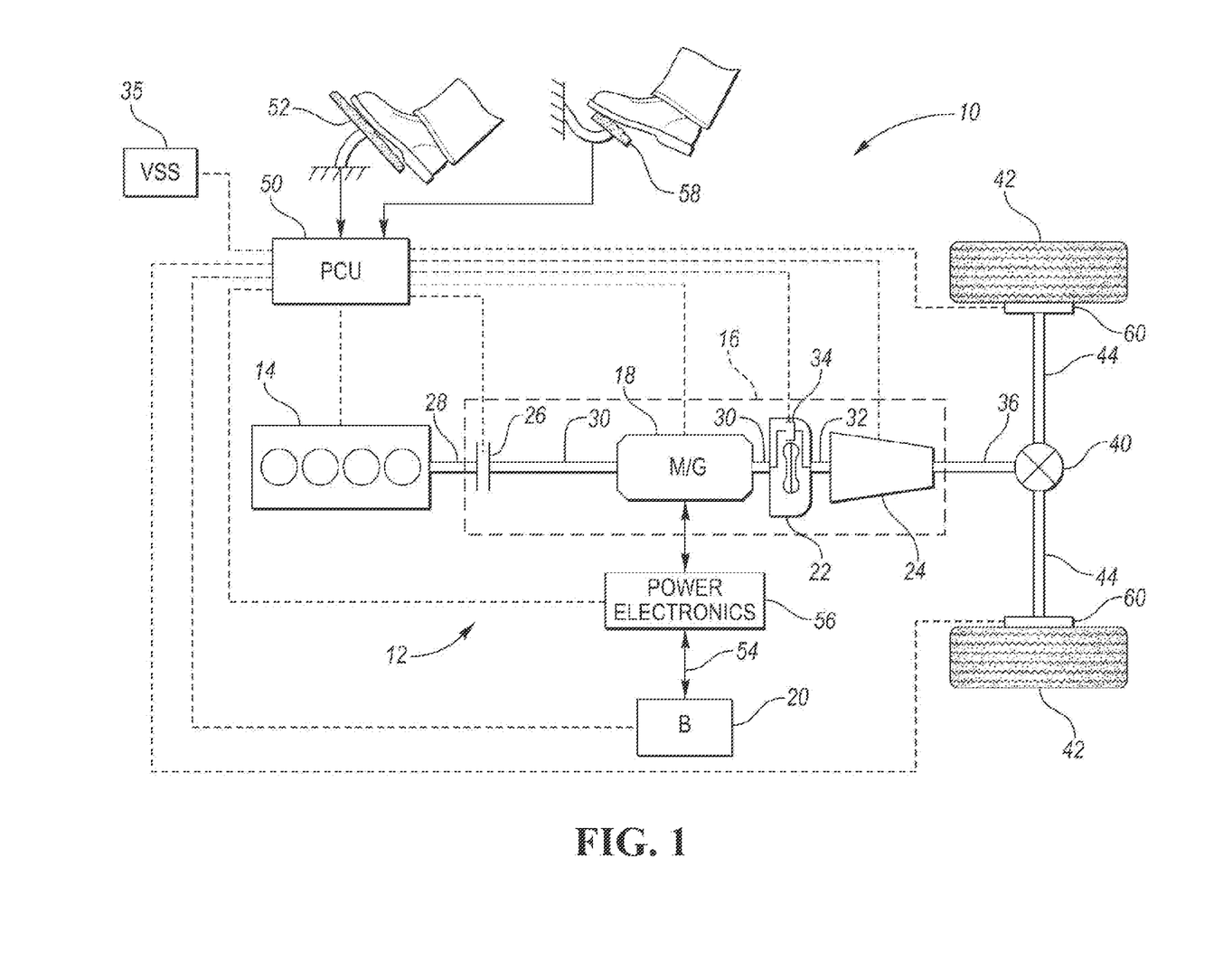
FIG. 1 is a schematic illustration of an exemplary powertrain of a hybrid vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10. The engine 14 and the M/G 18 may each be referred to as powerplants that are configured to generate power to propel the vehicle 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. The wheels 42 may be referred to as drive wheels that are driven by the powerplants (e.g., engine 14 and M/G 18) of the vehicle 10 via power that is transferred from the powerplants, through the subcomponents of the powertrain (e.g., torque converter 22, gearbox 24, shaft 36, differential 40, half shafts 44, etc.) to the drive wheels 42.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS) 35, coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component amount or presence, intake air flow (MAF), transmission gear, ratio, or mode, transmission oil temperature (TOT), transmission turbine speed (TS), torque converter bypass clutch 34 status (TCC), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

It should be understood that the schematic illustrated in FIG. 1 is merely exemplary and is not intended to be limiting. Other configurations are contemplated that utilize selective engagement of both an engine and a motor to transmit the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, vehicles powered only by an engine, micro-hybrid vehicles (i.e., powered by an engine only that has a start/stop function), series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
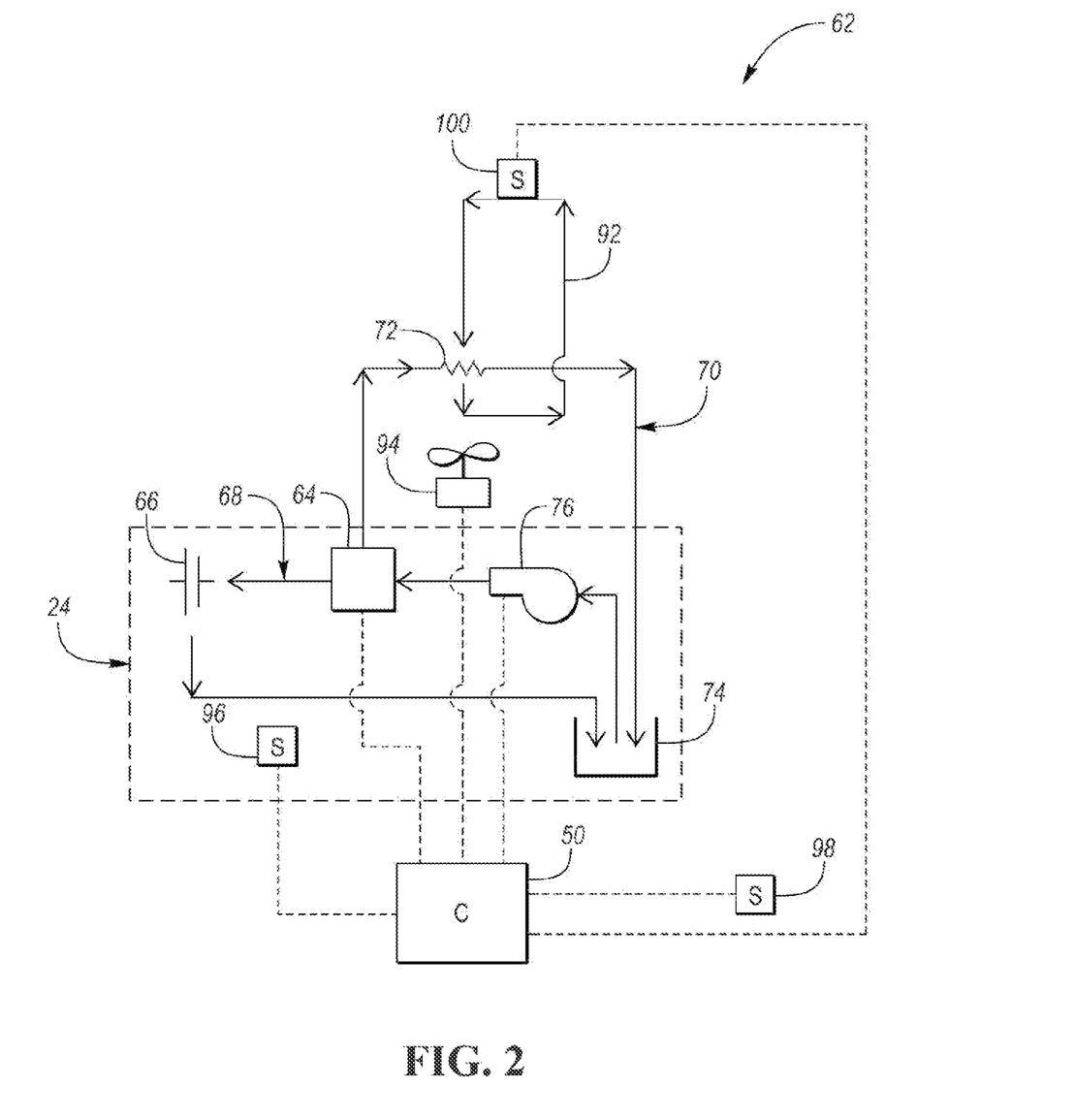
FIG. 2 is a schematic diagram of a fluid system for a transmission of the vehicle powertrain.
Figure 3:
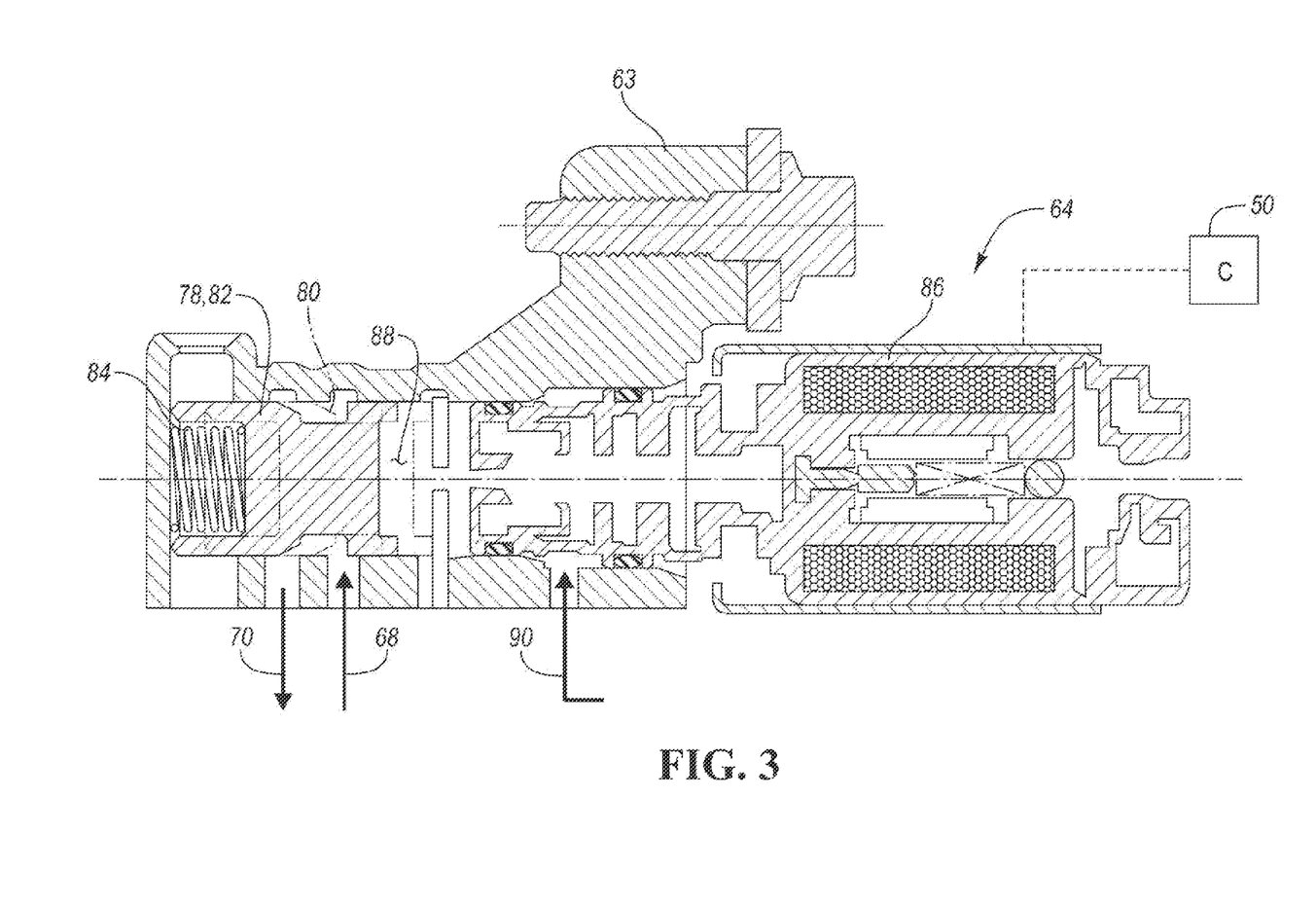
FIG. 3 is a cross-sectional view of a control valve for the fluid system of the transmission.

Referring to FIGS. 2 and 3, a fluid system 62 for the transmission or gearbox 24 and a control valve 64 for the fluid system 62 are illustrated. The control valve 64 may be in communication with and controlled by the controller 50. Typically, mechanical devices are utilized to open and close valves within transmissions or other powertrain components (e.g., transaxles, electric motor housings, engine disconnect clutch housings, etc.). Such mechanical devices may include a material, such as wax, that expands and contracts as the material is heated and cooled, respectively. The expanding and contracting material may adjust a position of a plunger or pin, which in turn adjusts the position the valve to open and close the valve. Here, electronic control signals are utilized to read, process, and control (e.g., command or manipulate) the position of the control valve 64 and other system hardware. A portion of a housing 63 of the transmission or gearbox 24 is also illustrated in FIG. 3. The transmission or gearbox 24 may include clutches 66 or brakes that are selectively engaged or disengaged to establish the multiple drive ratios. The fluid system 62 includes a primary fluid circuit 68 that is configured to direct fluid (e.g., transmission or hydraulic fluid or oil) to the clutches 66 or brakes to actuate (e.g., engage or disengage) the clutches 66 or brakes to establish the desired drive ratios. The fluid system 62 further includes a secondary fluid circuit 70 and a heat exchanger 72 that is connected to the secondary fluid circuit 70. The secondary fluid circuit 70 is configured to divert the fluid from the primary fluid circuit 68 and deliver the fluid to the heat exchanger 72. The transmission or gearbox 24 may include a sump 74 and a pump 76. The pump 76 is configured to draw fluid from the sump 74 and circulate the fluid through the primary fluid circuit 68. The fluid eventually returns to the sump 74 once circulated though the primary fluid circuit 68. The pump 76 may be in communication with and controlled by the controller 50.

The transmission or gearbox 24 may have a secondary electric pump that is configured to ensure fluid pressure is maintained within the transmission or gearbox 24 when the engine 14 is shutdown if the vehicle 10 has a start/stop function. The pump 76 may be operated by power from the engine 14 and would also be shutdown once the engine is shutdown. The secondary electric pump ensures the clutches remain engaged so that vehicle 10 may accelerate after a stop without hesitation once the operator releases the brake pedal 58 and/or engages the accelerator pedal 52. The secondary electric pump would maintain pressure and deliver fluid to the primary fluid circuit 68 to maintain clutch operation (i.e., maintain operation of the clutches 66 and brakes) and to the secondary fluid circuit 70 to maintain operation of the control valve 64 and other hardware that may be connected to the secondary fluid circuit 70. The secondary electric pump may deliver fluid to the secondary fluid circuit 70 via control valve 64 as illustrated or may directly diver fluid to the second fluid circuit separately from control valve 64.

The valve 64 is configured to close to isolate the secondary fluid circuit 70 from the primary fluid circuit 68. The valve 64 is also configured to open to direct fluid from the primary fluid circuit 68 to the secondary fluid circuit 70. The valve 64 may also be transitioned between partially opened positions to adjust a flow rate of the fluid from the primary fluid circuit 68 to the secondary fluid circuit 70 (e.g., the valve 64 may operate like a throttle to either increase or decrease the flow of fluid from the primary fluid circuit 68 to the secondary fluid circuit 70). The valve 64 may more specifically include a plunger 78 that is configured to transition between a closed position 80 to isolate the secondary fluid circuit 70 from the primary fluid circuit 68 and an open position 82 to direct fluid from the primary fluid circuit 68 to the secondary fluid circuit 70. The plunger 78 may adjusted to partially opened positions between the open position 82 and the closed position 80 to adjust the flow rate from the primary fluid circuit 68 to the secondary fluid circuit 70. The flow rate from the primary fluid circuit 68 to the secondary fluid circuit 70 may increase over the partially opened positions as the plunger 78 transitions away from the closed position 80 and toward the opened position 82, which may more specifically be a fully opened position. A biasing element 84, such as a spring, may bias the plunger 78 toward the closed position 80.

A variable bleed solenoid 86 may be configured to direct fluid into and out of a control chamber 88 to adjust the position of the plunger 78. A control fluid, that is directed into and out of the control chamber 88, may be directed into the variable bleed solenoid via fluid line 90. Fluid line 90 may also receive fluid from the sump 74 via the pump 76. However, the pressure in the fluid line 90 may be stepped down via a device, such as a restrictor orifice, so that it is lower than the pressure of the fluid in the primary fluid circuit 68 and the secondary fluid circuit 70. The fluid from the fluid line 90 and the secondary fluid circuit 70 eventually returns to the sump 74 once circulated though the fluid line 90 and the secondary fluid circuit 70.

The heat exchanger 72 may be configured to exchange heat between the fluid flowing through the secondary fluid circuit 70 and a secondary fluid flowing through a tertiary fluid circuit 92. For example, the tertiary fluid circuit 92 may be configured to direct coolant to the engine 14, to the battery 20, to the M/G 18, etc. The secondary fluid may be a refrigerant configured to cool the cabin, battery 20, etc. The tertiary fluid circuit 92 may include a pump or compressor that may be in communication with and controlled by the controller 50. Alternatively, the heat exchanger 72 may be configured to exchange heat between the fluid flowing through the secondary fluid circuit 70 and the ambient air. In such an alternative embodiment, the tertiary fluid circuit 92 may be excluded. Also, a fan 94 may be utilized to direct the ambient air across the heat exchanger 72 in such an alternative embodiment. The fan 94 may be in communication with and controlled by the controller 50.

The transmission or gearbox 24 may include a temperature sensor 96 that is configured to detect the temperature of the fluid within the gearbox 24 and communicate the temperature of the fluid to the controller 50. The temperature sensor 96 may be positioned at any position with the transmission or gearbox 24. For example, the temperature sensor 96 may be positioned to determine the temperature of the fluid at the sump 74, at any position along the primary fluid circuit 68, at any position along the secondary fluid circuit 70, or along any other fluid circuit within the transmission or gearbox 24. It may, however, be desirable to place the temperature sensor 96 at a positioned where the fluid is the hottest within the transmission or gearbox 24.

The vehicle 10 may also include an ambient air temperature sensor 98 that is configured to detect a temperature of the ambient air and communicate the temperature of the ambient air to the controller 50. The ambient air temperature sensor 98 may be particularly useful if ambient air is being directed across the heat exchanger 72 such that heat is being exchanged between the fluid flowing through the secondary fluid circuit 70 and the ambient air. The vehicle 10 may also include a secondary temperature sensor 100 that is configured to detect a temperature of the fluid in the tertiary fluid circuit 92 and communicate the temperature of the fluid in the tertiary fluid circuit 92 to the controller 50. The secondary temperature sensor 100 may be particularly useful if the heat exchanger 72 is being utilized to exchange heat between the fluid flowing through the secondary fluid circuit 70 and the secondary fluid flowing through a tertiary fluid circuit 92.

Figure 4:
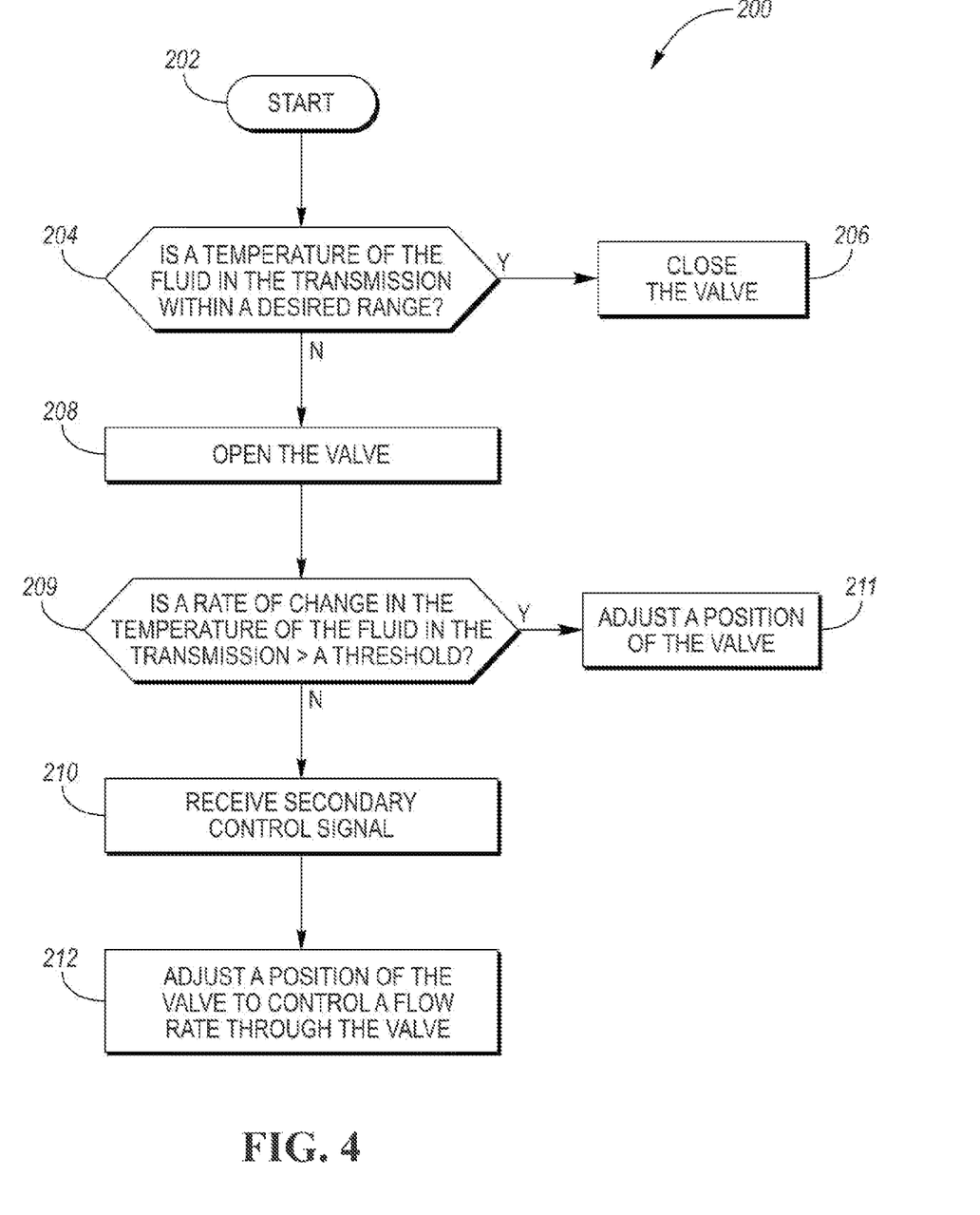
FIG. 4 is flowchart illustrating a method of controlling the fluid flow through the fluid system of the transmission.

Referring to FIG. 4, a flowchart illustrating a method 200 of controlling the fluid flow through the fluid system 62 for the transmission or gearbox 24 is illustrated. The method 200 may be implemented the controller 50. The method 200 may be stored as control logic and/or algorithms within the controller 50. The controller 50 may be configured to control the operation of various components of the gearbox 24, fluid system 62, and/or vehicle 10 in response to various conditions of the gearbox 24, fluid system 62, and/or vehicle 10. The method 200 begins at start block 202. The method 200 may be initiated at start block 202 once an ignition of the vehicle 10 has been turned to an "on" position.

The method 200 then moves on to block 204 where it is determined if a temperature of the fluid within the transmission or gearbox 24 is within a desired range. The temperature of the fluid within the transmission or gearbox 24 may be measured via temperature sensor 96 and communicated back to the controller 50. If the temperature of the fluid within the transmission or gearbox 24 is within the desired range, the method 200 moves on to block 206 where the control valve 64, or more specifically the plunger 78, is maintained or transitioned to the closed position 80 to isolate the fluid flowing through the primary fluid circuit 68 from the secondary fluid circuit 70 and from the heat exchanger 72. If the temperature of the fluid within the transmission or gearbox 24 is outside of the desired range, the method 200 moves on to block 208 where the control valve 64, or more specifically the plunger 78, is maintained or transitioned to the open position 82 to direct the fluid flowing through the primary fluid circuit 68 to the secondary fluid circuit 70 and to the heat exchanger 72 in order to control heat exchange to or from the fluid via the heat exchanger 72 to drive the temperature of the fluid toward the desired range. It is desirable to maintain the temperature of the fluid within the transmission or gearbox 24 in order to maintain proper cooling of the components within the transmission or gearbox 24, maintain proper lubrication of the moving components within the transmission or gearbox 24, and ensure proper operation (engagement and disengagement) of the clutches 66 or brakes within the transmission or gearbox 24.

Also at block 208, the method 200 may be configured to adjust the control valve 64, or more specifically the plunger 78, between partially opened positions to either increase or decrease the flow rate of the fluid from the primary fluid circuit 68 to the secondary fluid circuit 70 and heat exchanger 72. For example, if there is a change in the temperature of the fluid within the transmission or gearbox 24 toward the desired range, the control valve 64, or more specifically the plunger 78, may be adjusted to a partially opened position and toward the closed positioned 80 to decrease the flow rate of the fluid from the primary fluid circuit 68 to the secondary fluid circuit 70, which in turn decreases the amount of heat being exchanged to or from the fluid at the heat exchanger 72. As another example, if there is a change in the temperature of the fluid within the transmission or gearbox 24 away from the desired range, the control valve 64, or more specifically the plunger 78, may be adjusted to a partially opened position and toward the fully opened position 82 to increase the flow rate of the fluid from the primary fluid circuit 68 to the secondary fluid circuit 70, which in turn increases the amount of heat being exchanged to or from the fluid at the heat exchanger 72. If the vehicle 10 includes a secondary electric pump, the speed of the secondary electric pump may be increased or decreased, in addition to or alternatively to adjusting the position of the plunger 78 at block 208, to increase or decrease the flow rate of the fluid to the secondary fluid circuit 70, respectively.

The method 200 next, moves on to block 209 where it is determined if a rate of change of the temperature of the fluid within the transmission or gearbox 24 is greater than a threshold. If the rate of change of the temperature of the fluid within the transmission or gearbox 24 is not greater than the threshold, the position of the control valve 64 is not further adjusted from block 209 and the method moves on to block 210. If the rate of change of the temperature of the fluid within the transmission or gearbox 24 is greater than the threshold, the position of the control valve 64 is adjusted at block 211.

More specifically, at block 211 if the temperature of the fluid within the transmission or gearbox 24 is increasing at a rate that is greater than the threshold, the control valve 64, or more specifically the plunger 78, may be adjusted to a partially opened position and toward the fully opened position 82 to increase the flow rate of the fluid from the primary fluid circuit 68 to the secondary fluid circuit 70, which in turn increases the amount of heat being exchanged to or from the fluid at the heat exchanger 72. If the vehicle 10 includes a secondary electric pump, the speed of the secondary electric pump may be increased in addition to or alternatively to adjusting the plunger 78 toward the closed position to decrease the flow rate of the fluid to the secondary fluid circuit 70.

Alternatively at block 211, if the temperature of the fluid within the transmission or gearbox 24 is decreasing at a rate that is greater than the threshold, the control valve 64, or more specifically the plunger 78, may be adjusted to a partially opened position and toward the closed positioned 80 to decrease the flow rate of the fluid from the primary fluid circuit 68 to the secondary fluid circuit 70, which in turn decreases the amount of heat being exchanged to or from the fluid at the heat exchanger 72. If the vehicle 10 includes a secondary electric pump, the speed of the secondary electric pump may be decreased in addition to or alternatively to adjusting the plunger 78 toward the closed position to decrease the flow rate of the fluid to the secondary fluid circuit 70. The threshold rate of change at block 209 may be the same or different depending on whether or not the temperature is increasing or decreasing.

Block 209 may be utilized to detect an internal fluid leak or restriction inside the transmission primary fluid circuit 68 or secondary fluid circuit 70, which affects the ability of the transmission fluid to "normally" accept or reject temperature. The controller 50 may then "decide" to "send more" or "send less" fluid to the heat exchanger 72 to compensate for the temperature difference. In a "large" internal leak situation, the rate of change in the temperature of the fluid in the transmission or gearbox 24 may be programed to set a MIL (malfunction indication light) and allow the controller 50 to decrease or derate the power output of the vehicle 10 to prevent an "over temperature" event of the transmission fluid from occurring.

Block 209 may alternatively or additionally branch from block 206. In such an alternative and in the event the rate of change of the temperature of the fluid within the transmission or gearbox 24 is greater than the threshold, the method would move on to block 211. Also, in such an alternative and in the event the rate of change of the temperature of the fluid within the transmission or gearbox 24 is less than the threshold, the method would return to block 206.

The method 200 next moves on to block 210 where a secondary signal is received by the controller 50. The secondary signal may be a temperature of the ambient air received from the ambient air temperature sensor 98, a temperature of the secondary fluid in the tertiary fluid circuit 92 received from the secondary temperature sensor 100, a vehicle speed received from the vehicle speed sensor 35, or a powertrain torque command received from the accelerator pedal 52. The position of the control valve 64, or more specifically the plunger 78, may then be adjusted at block 212 to control the flow rate of the fluid from the primary fluid circuit 68 to the secondary fluid circuit 70 and heat exchanger 72 to further control heat transfer to or from the fluid via the heat exchanger 72 and drive the temperature of the fluid in the transmission or gearbox 24 toward the desired range.

If the secondary signal is an ambient air temperature at block 210 and the heat exchanger 72 is configured to exchange heat between the ambient air and the fluid flowing through the secondary fluid circuit 70, the position of the control valve 64, or more specifically the plunger 78, may be adjusted at block 212 based on the temperature of the fluid in the transmission or gearbox 24 and the temperature of the ambient air in order to adjust the flow rate of the fluid from the primary fluid circuit 68 to the secondary fluid circuit 70. Such an adjustment in the position of the valve 64 may be an adjustment between partially opened positions to control the heat exchange between the fluid in the transmission or gearbox 24 and the ambient air and to drive the temperature of the fluid in the transmission or gearbox 24 toward the desired range. Heat exchange between the ambient air and the fluid in the transmission or gearbox 24 increases as the flow rate of the fluid through the valve 64 increases and as a temperature difference between the ambient air and the fluid in the transmission or gearbox 24 increases.

As the temperature of the fluid in the transmission or gearbox 24 further deviates from the desired range and/or as the temperature difference between the ambient air and the fluid in the transmission or gearbox 24 decreases, the control valve 64, or more specifically the plunger 78, may be adjusted to a partially opened position and toward the fully opened position 82 to increase the flow rate of the fluid from the primary fluid circuit 68 to the secondary fluid circuit 70, which in turn increases the amount of heat being exchanged to or from the fluid in the transmission or gearbox 24 at the heat exchanger 72. On the other hand, as the temperature of the fluid in the transmission or gearbox 24 approaches the desired range and/or as the temperature difference between the ambient air and the fluid in the transmission or gearbox 24 increases, the control valve 64, or more specifically the plunger 78, may be adjusted to a partially opened position and toward the closed positioned 80 to decrease the flow rate of the fluid from the primary fluid circuit 68 to the secondary fluid circuit 70, which in turn decreases the amount of heat being exchanged to or from the fluid in the transmission or gearbox 24 at the heat exchanger 72. The desired flow rate of the fluid through the control valve 64 relative to the deviation of the fluid in the transmission or gearbox 24 from the desired temperature range and relative to the temperature difference between the ambient air and the fluid in the transmission or gearbox 24 may be stored in look-up tables within the controller 50.

If the secondary signal is a temperature of the secondary fluid in the tertiary fluid circuit 92 at block 210 and the heat exchanger 72 is configured to exchange heat between the secondary fluid in the tertiary fluid circuit 92 and the fluid flowing through the secondary fluid circuit 70, the position of the control valve 64, or more specifically the plunger 78, may be adjusted at block 212 based on the temperature of the fluid in the transmission or gearbox and the temperature of the secondary fluid in the tertiary fluid circuit 92 in order to adjust the flow rate of the fluid from the primary fluid circuit 68 to the secondary fluid circuit 70. Such an adjustment in the position of the valve 64 may be an adjustment between partially opened positions to control the heat exchange between the fluid in the transmission or gearbox 24 and the secondary fluid and to drive the temperature of the fluid in the transmission or gearbox 24 toward the desired range. Heat exchange between the secondary fluid and the fluid in the transmission or gearbox 24 increases as the flow rate of the fluid through the valve 64 increases and as a temperature difference between the secondary fluid and the fluid in the transmission or gearbox 24 increases.

As the temperature of the fluid in the transmission or gearbox 24 further deviates from the desired range and/or as the temperature difference between the secondary fluid and the fluid in the transmission or gearbox 24 decreases, the control valve 64, or more specifically the plunger 78, may be adjusted to a partially opened position and toward the fully opened position 82 to increase the flow rate of the fluid from the primary fluid circuit 68 to the secondary fluid circuit 70, which in turn increases the amount of heat being exchanged to or from the fluid at the heat exchanger 72. On the other hand, as the temperature of the fluid in the transmission or gearbox 24 approaches the desired range and/or as the temperature difference between the secondary fluid and the fluid in the transmission or gearbox 24 increases, the control valve 64, or more specifically the plunger 78, may be adjusted to a partially opened position and toward the closed positioned 80 to decrease the flow rate of the fluid from the primary fluid circuit 68 to the secondary fluid circuit 70, which in turn decreases the amount of heat being exchanged to or from the fluid in the transmission or gearbox 24 at the heat exchanger 72. The desired flow rate of the fluid through the control valve 64 relative to the deviation of the fluid in the transmission or gearbox 24 from the desired temperature range and relative to the temperature difference between the secondary fluid and the fluid in the transmission or gearbox 24 may be stored in look-up tables within the controller 50. Additional information within the look up tables may include the flow rate of the secondary fluid in the tertiary fluid circuit 92, which may increase heat transfer between the fluid and the secondary fluid as the flow rate of the secondary fluid increases.

If the secondary signal is a vehicle speed or a powertrain torque command at block 210, the position of the control valve 64, or more specifically the plunger 78, may be adjusted at block 212 based on the temperature of the fluid in the transmission or gearbox 24 and the vehicle speed or the powertrain torque command in order to adjust the flow rate of the fluid from the primary fluid circuit 68 to the secondary fluid circuit 70. Such an adjustment in the position of the valve 64 may be an adjustment between partially opened positions to control the heat exchange to or from the fluid in the transmission or gearbox 24 at the heat exchanger 72 to drive the temperature of the fluid in the transmission or gearbox 24 toward the desired range. Heat exchange to or from the fluid in the transmission or gearbox 24 at the heat exchanger 72 increases as the flow rate of the fluid through the valve 64 increases.

As the temperature of the fluid in the transmission or gearbox 24 further deviates from the desired range and/or as additional heat is generated within the fluid in the transmission or gearbox 24, which may be caused by an increase in speed or torque acting on the moving parts in the transmission or gearbox 24, the control valve 64, or more specifically the plunger 78, may be adjusted to a partially opened position and toward the fully opened position 82 to increase the flow rate of the fluid from the primary fluid circuit 68 to the secondary fluid circuit 70, which in turn increases the amount of heat being exchanged to or from the fluid in the transmission or gearbox 24 at the heat exchanger 72. On the other hand, as the temperature of the fluid in the transmission or gearbox 24 approaches the desired range and/or as the additional heat within the fluid in the transmission or gearbox 24 caused by speed or torque acting on the moving parts decreases, the control valve 64, or more specifically the plunger 78, may be adjusted to a partially opened position and toward the closed positioned 80 to decrease the flow rate of the fluid from the primary fluid circuit 68 to the secondary fluid circuit 70, which in turn decreases the amount of heat being exchanged to or from the fluid in the transmission or gearbox 24 at the heat exchanger 72. The desired flow rate of the fluid through the control valve 64 relative to the deviation of the fluid in the transmission or gearbox 24 from the desired temperature range and relative to either the vehicle speed or the powertrain torque command may be stored in look-ups table within the controller 50.

The desired flow rate of the fluid through the control valve 64 may be stored in look-up tables based on any combination of the factors described herein (e.g., the deviation of the fluid in the transmission or gearbox 24 from the desired temperature range, the ambient air temperature, the temperature difference between the fluid in the transmission or gearbox 24 and the ambient air, the temperature of the secondary fluid, the temperature difference between the fluid in the transmission or gearbox 24 and the secondary fluid, the flow rate of the secondary fluid, the vehicle speed, or the powertrain torque command). The deviation of the fluid in the transmission or gearbox 24 from the desired temperature range may include either or both temperature deviations that are above or below the desired temperature range. For example, if the temperature of the fluid in the transmission or gearbox 24 is greater than the desired range, which may occur in regions with warmer climates, the heat exchanger 72 may be utilized to cool the fluid in the transmission or gearbox 24. As another example, if the temperature of the fluid in the transmission or gearbox 24 is less than that the desired range, which may occur in regions with cooler climates, the heat exchanger may be utilized to heat the fluid in the transmission or gearbox 24. Furthermore, the system described herein may be utilized in any powertrain component that includes a fluid (e.g., hydraulic fluid or oil) that requires heating or cooling, such as a transaxle, an electric motor housing, an engine disconnect clutch housing, etc.

If the vehicle 10 includes a secondary electric pump, the speed of the secondary electric pump may be increased or decreased, in addition to or alternatively to adjusting the position of the plunger 78 at block 212, to increase or decrease the flow rate of the fluid to the secondary fluid circuit 70, respectively.

It should be understood that the flowchart in FIG. 4 is for illustrative purposes only and that the method 200 should not be construed as limited to the flowchart in FIG. 4. Some of the steps of the method 200 may be rearranged while others may be omitted entirely.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising;
   a powerplant configured to generate power to propel the vehicle;
   drive wheels;
   a heat exchanger;
   a transmission configured to transfer the power from the powerplant to the drive wheels, the transmission having,
     at least one clutch,
     a primary circuit configured direct fluid to the at least one clutch to actuate the at least one clutch,
     a secondary circuit configured to (i) divert the fluid from the primary circuit and (ii) deliver the fluid to the heat exchanger, and
     a valve configured to control flow of the fluid from the primary circuit to the secondary circuit, wherein the valve is configured to (i) close to isolate the secondary circuit from the primary circuit and (ii) open to direct fluid from the primary circuit to the secondary circuit, a temperature sensor configured to detect a temperature of the fluid;
a vehicle speed sensor configured to detect a vehicle speed; and
a controller programmed to,
  in response to receiving a signal from the temperature sensor indicating that the temperature of the fluid is outside of a desired range, open the valve to direct the fluid toward the heat exchanger via the secondary circuit,
  in response to receiving a signal from the temperature sensor indicating that the temperature of the fluid is within the desired range, close the valve to isolate the fluid from the secondary circuit and the heat exchanger, and
  in response to receiving (i) the signal from the temperature sensor indicating that the temperature of the fluid is outside of the desired range and (ii) a signal from the vehicle speed sensor indicative of the vehicle speed, adjust a position of the valve based on the vehicle speed to adjust a flow rate of the fluid from the primary circuit to the secondary circuit to (a) control heat transfer to or from the fluid via the heat exchanger and (b) drive the temperature of the fluid toward the desired range.

2. The vehicle of claim 1, wherein the heat exchanger is configured to transfer heat between ambient air and the fluid.

3. The vehicle of claim 2 further comprising an ambient air temperature sensor configured to detect a temperature of the ambient air, and wherein the controller is further programmed to, in response to receiving (i) the signal from the temperature sensor indicating that the temperature of the fluid is outside of the desired range and (ii) a signal from the ambient air temperature sensor indicative of the temperature of the ambient air, adjust a position of the valve based on the temperatures of the fluid and the ambient air to adjust a flow rate of the fluid from the primary circuit to the secondary circuit to (a) control heat exchange between fluid and the ambient air and (b) drive the temperature of the fluid toward the desired range.

4. The vehicle of claim 1, wherein the heat exchanger is configured to transfer heat between a secondary fluid and the fluid.

5. The vehicle of claim 4 further comprising a secondary temperature sensor configured to detect a temperature of the secondary fluid, and wherein the controller is further programmed to, in response to receiving (i) the signal from the temperature sensor indicating that the temperature of the fluid is outside of the desired range and (ii) a signal from the secondary temperature sensor indicative of the temperature of the secondary fluid, adjust a position of the valve based on the temperatures of the fluid and the secondary fluid to adjust a flow rate of the fluid from the primary circuit to the secondary circuit to (a) control heat exchange between the fluid and the secondary fluid and (b) drive the temperature of the fluid toward the desired range.

6. The vehicle of claim 4 further comprising a tertiary fluid circuit, and wherein the secondary fluid is disposed within and configured to flow through the tertiary fluid circuit.

7. The vehicle of claim 1 further comprising an accelerator pedal configured to generate a powertrain torque command, and wherein the controller is further programmed to, in response to receiving (i) the signal from the temperature sensor indicating that the temperature of the fluid is outside of the desired range and (ii) the powertrain torque command, adjust a position of the valve based on the powertrain torque command to adjust a flow rate of the fluid from the primary circuit to the secondary circuit to (a) control heat transfer to or from the fluid via the heat exchanger and (b) drive the temperature of the fluid toward the desired range.

8. A vehicle comprising;
a heat exchanger;
a transmission configured to transfer power within a powertrain, the transmission having,
  a primary fluid circuit configured to deliver fluid to at least one clutch,
  a secondary fluid circuit configured to (i) divert the fluid from the primary fluid circuit and (ii) deliver the fluid to the heat exchanger, and
  a valve configured to (i) close to isolate the secondary fluid circuit from the primary fluid circuit, (ii) open to direct fluid from the primary fluid circuit to the secondary fluid circuit, and (iii) transition between partially opened positions to adjust a flow rate of the fluid from the primary fluid circuit to the secondary fluid circuit; and
a controller programmed to,
  in response to a temperature of the fluid being outside of a desired range, open the valve to direct the fluid toward the heat exchanger via the secondary fluid circuit,
  in response to the temperature of the fluid being within the desired range, close the valve to isolate the fluid from the secondary fluid circuit and the heat exchanger,
  in response to a change in the temperature of the fluid toward the desired range, adjust the valve between the partially opened positions to decrease the flow rate of the fluid from the primary fluid circuit to the secondary fluid circuit,
  in response to a change in the temperature of the fluid away from the desired range, adjust the valve between the partially opened positions to increase the flow rate of the fluid from the primary fluid circuit to the secondary fluid circuit, and
  adjust the valve between the partially opened positions based on a powertrain torque command to (i) control heat transfer to or from the fluid via the heat exchanger and (ii) drive the temperature of the fluid toward the desired range.

9. The vehicle of claim 8, wherein the heat exchanger is configured to transfer heat between ambient air and the fluid.

10. The vehicle of claim 9, wherein the controller is further programmed to adjust the valve between the partially opened positions based on the temperature of the fluid and a temperature of the ambient air to adjust the flow rate of the fluid from the primary fluid circuit to the secondary fluid circuit to (i) control heat exchange between fluid and the ambient air and (ii) drive the temperature of the fluid toward the desired range.

11. The vehicle of claim 8, wherein the heat exchanger is configured to transfer heat between a secondary fluid and the fluid.

12. The vehicle of claim 11, wherein the controller is further programmed to adjust the valve between the partially opened positions based on the temperature of the fluid and a temperature of the secondary fluid to adjust the flow rate of the fluid from the primary fluid circuit to the secondary fluid circuit to (i) control heat exchange between the fluid and the secondary fluid and (ii) drive the temperature of the fluid toward the desired range.

13. The vehicle of claim 11 further comprising a tertiary fluid circuit, and wherein the secondary fluid is disposed within and configured to flow through the tertiary fluid circuit.

14. The vehicle of claim 8, wherein the controller is further programmed to adjust the valve between the partially opened positions based on a vehicle speed to (i) control heat transfer to or from the fluid via the heat exchanger and (ii) drive the temperature of the fluid toward the desired range.

15. A vehicle comprising:
a heat exchanger;
a transmission configured to transfer power within a powertrain, the transmission having,
  a primary fluid circuit,
  a secondary fluid circuit configured to (i) divert fluid from the primary fluid circuit and (ii) deliver the fluid to the heat exchanger, and
  a valve configured to (i) close to isolate the secondary fluid circuit from the primary fluid circuit, (ii) open to direct fluid from the primary fluid circuit to the secondary fluid circuit, and (iii) transition between partially opened positions to adjust a flow rate of the fluid from the primary fluid circuit to the secondary fluid circuit; and
a controller programmed to,
  in response to a temperature of the fluid being outside of a desired range, open the valve to direct the fluid toward the heat exchanger via the secondary fluid circuit,
  in response to the temperature of the fluid being within the desired range, close the valve to isolate the fluid from the secondary fluid circuit and the heat exchanger, and
  adjust the valve between the partially opened positions based on a temperature of a secondary fluid flowing through the heat exchanger.

16. The vehicle of claim 15, wherein the controller is further programmed to, in response to a change in the temperature of the fluid toward the desired range, adjust the valve between the partially opened positions to decrease the flow rate of the fluid from the primary fluid circuit to the secondary fluid circuit.

17. The vehicle of claim 15, wherein the controller is further programmed to, in response to a change in the temperature of the fluid away from the desired range, adjust the valve between the partially opened positions to increase the flow rate of the fluid from the primary fluid circuit to the secondary fluid circuit.

18. The vehicle of claim 15, wherein the controller is further programmed to adjust the valve between the partially opened positions based on a vehicle speed.

19. The vehicle of claim 15 further comprising a tertiary fluid circuit, and wherein the secondary fluid is disposed within and configured to flow through the tertiary fluid circuit.

20. The vehicle of claim 15, wherein the controller is further programmed to adjust the valve between the partially opened positions based on a powertrain torque command.

* * * * *